N. B. MILLER.
PACKING.
APPLICATION FILED APR. 5, 1916.

1,211,476.

Patented Jan. 9, 1917.

INVENTOR
Norman Bruce Miller
BY
Arthur Phelps Marr
ATTORNEY

UNITED STATES PATENT OFFICE.

NORMAN BRUCE MILLER, OF WEST COLLINGSWOOD, NEW JERSEY.

PACKING.

1,211,476.     Specification of Letters Patent.     Patented Jan. 9, 1917.

Application filed April 5, 1916. Serial No. 89,011.

*To all whom it may concern:*

Be it known that I, NORMAN BRUCE MILLER, a citizen of the United States, and resident of the town of West Collingswood, county of Camden, State of New Jersey, have invented certain new and useful Improvements in Packings, of which the following is a specification.

The subject of this invention is a diagonal packing so constructed that it may be applied and generally used as an ordinary solid packing, but when so applied and in actual use it will develop all of the advantages and none of the disadvantages of a diagonal packing.

Packings having opposed wedge shaped portions have been known in the past, but it was found necessary to provide means for retaining such packings with their separate parts secured adjacent to each other to secure them, an external casing or wrapping was employed and as it was impossible to remove this wrapping after the packing was in place, the wrapping itself became the packing and the wedge portions merely a reinforcing device.

Where diagonal wedge shaped packings were constructed it was not found possible to make them in the well known spiral shape in which packings are usually made and the engineer or operator was not at liberty to cut a ring of desired size or diameter. From such packing as to cut common diagonal packing meant to loosen the parts to such an extent that it became practically impossible to place the packing in operable position.

In this application I will endeavor to develop a diagonal packing having two independently operative members and yet so constructed that the packing may be formed as a spiral to be cut at any time and to any size.

Other advantages, the construction and method of operation will be set forth as the specification progresses.

Figure 1:
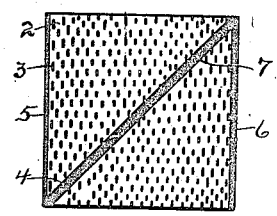
Figure 2:
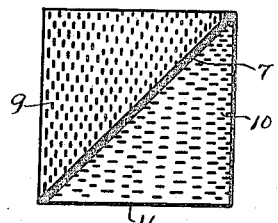
Figure 3:
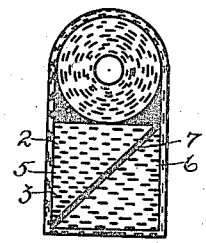

The following is what I consider a good means of carrying out this invention and the accompanying drawing should be considered together with the specification which follows:

Figure 1. shows a cross sectional view of a packing made according to my invention. Fig. 2. shows a cross section of a compressible packing. Fig. 3. a cross section of a modification.

In constructing this packing any general means may be employed. I may form the packing as a sheet in which alternate layers of fabric 2, are secured and vulcanized between alternate layers of what is commonly called friction 3. This friction may be vulcanized rubber, the nature of which is well understood by makers of packing. After the sheet is formed, blocks of desirable cross section as indicated by the shape shown in Fig. 1, and which may be of any desirable length, are cut from the sheet and each resultant strip or block is cut diagonally across as indicated at 4. This will result in the production of two diagonally cut wedged or right triangularly shaped members 5 and 6. Between these members 5 and 6, and along the line of the diagonal cut I will apply a friction or cement or gum as indicated at 7, I will then press the two parts 5 and 6, together until the cement or gum is hardened to a desirable extent. My packing will then be found ready for use and it may be coiled or rolled in the common spiral shape. In use a ring of the desired diameter is cut from the coil or spiral and is applied about the rod in the ordinary manner customary with solid packing. When the packing is in use the pressure of the gland will serve to force the two parts of the packing out of their original position causing one portion to ride upon the other with the result that that part of the packing which rests upon the piston rod will be forcibly impinged upon the rod. The force of the contact being determined by the pressure obtained by the gland or in the adjustment of the stuffing box. Although the gland pressure may be depended upon to separate the two parts of the packing, the rise in temperature caused by the steam in the cylinder or the friction between the packing and the piston rod will also assist in the separation by softening the adhesive material between the two adjacent parts of the packing making its separation more rapid and after the packing has been in use even a short space of time it will be found that it will operate just in the manner desired of packings of this nature and construction.

It will of course be obvious that my improvements may be applied in a packing such as is shown in Fig. 3, with all desirable advantages and it will be further understood that the arrangement of the diagonal weave between the two members of the packing may be changed at will and that they may be opposed in the manner shown at 9 and 10, in Fig. 2, this might have the advantage of preventing a possible chipping of the corners particularly if the wearing surfaces be the surface indicated at 11. I believe however that in a packing constructed as herein set forth, the disagreeable chipping so apt to occur will be entirely avoided by reason of the fact that the adhesive material 7, will so strongly reinforce and support the edges or sides of the packing that chipping will be almost impossible.

It will of course be understood that modifications may be made and that the adhesive material employed may be any material that will operate in the manner herein set forth, and that packing made of lead, iron or in fact any metal or other material, may be constructed and operated in the manner herein set forth.

Having carefully and fully described my invention what I claim and desire to secure by Letters Patents is:

1. A packing in two parts and an adhesive substance having a low melting point and adapted to secure said parts during the application and to release them for independent operation after said packing is applied in position.

2. A packing in two parts adapted to wedge one upon another and means adapted to be applied between said parts for retaining said parts in operative relation during the preparation and application of said packing and to release said parts by the raise in temperature due to useful operation.

NORMAN BRUCE MILLER.